(No Model.)
G. W. BIDDELL.
CONVERTIBLE GARDENING AND FIELD IMPLEMENT.
No. 548,348. Patented Oct. 22, 1895.
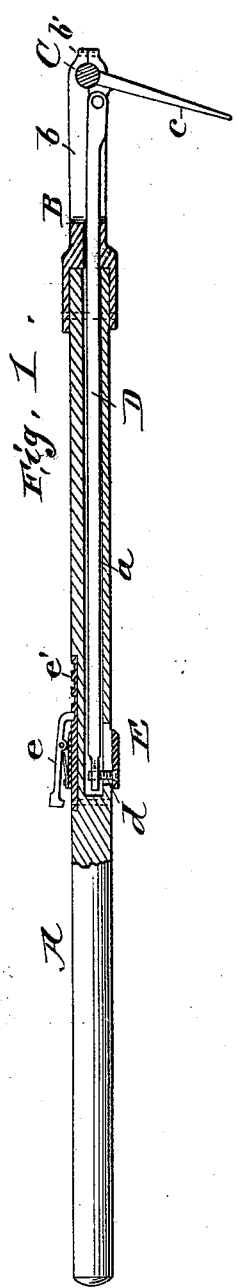
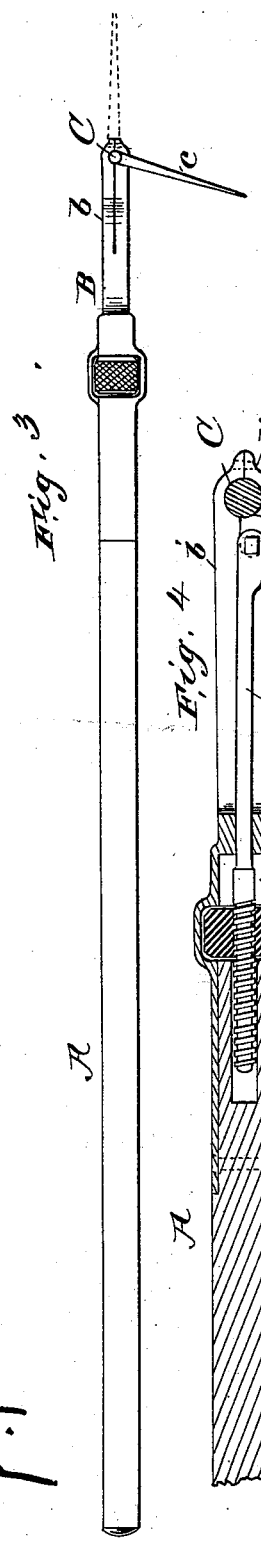
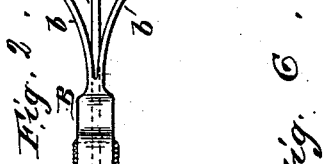
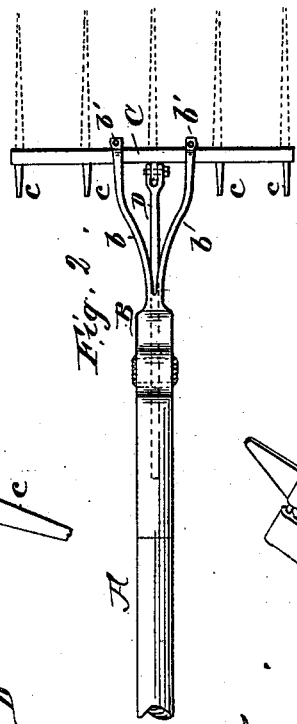
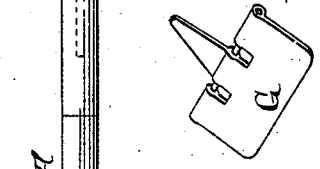
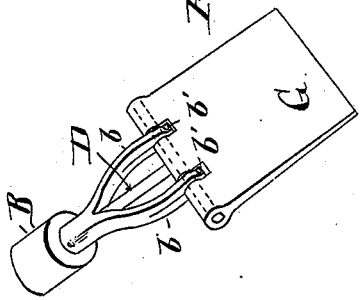
WITNESSES:
C. W. Benjamin
Perry T. Griffiths
INVENTOR
George W. Biddell
BY
Edgar Tate & Co
ATTORNEYS

UNITED STATES PATENT OFFICE.

GEORGE WASHINGTON BIDDELL, OF CHATTANOOGA, TENNESSEE.

CONVERTIBLE GARDENING AND FIELD IMPLEMENT.

SPECIFICATION forming part of Letters Patent No. 548,348, dated October 22, 1895.

Application filed March 9, 1895. Serial No. 541,134. (No model.)

*To all whom it may concern:*

Be it known that I, GEORGE WASHINGTON BIDDELL, a citizen of the United States, and a resident of Chattanooga, county of Hamilton, and State of Tennessee, have invented certain new and useful Improvements in Convertible Gardening and Field Implements, of which the following is a specification, reference being had to the accompanying drawings, forming a part thereof, in which similar letters of reference indicate corresponding parts in all the figures.

My invention relates to certain new and useful improvements in a convertible fork and rake; and it has for its object to provide a simple device which can be employed as a fork or rake and easily and quickly converted into one or the other by a simple manipulation of its parts.

With these and other ends in view the invention contemplates a handle, a cross-bar pivotally secured on the end of said handle and carrying a suitable number of fingers or tines, and a rod connected to one of the fingers or tines and adapted to be operated by suitable mechanism on the handle to move the cross-bar into a position so that the device may be used as a rake or a fork.

My invention consists, further, of certain details of construction and arrangements of parts, all of which will be fully described and claimed hereinafter.

In the accompanying drawings, Figure 1 is a side elevation of the device, partly in section, showing it arranged as a rake. Fig. 2 is a top plan view. Fig. 3 is a side elevation showing a different means for operating the device. Fig. 4 is a sectional view of Fig. 3, and Figs. 5 and 6 are perspective views of a hoe-blade which may be substituted for the fingers or tines to provide a convertible hoe and spade.

A designates the handle of my improved device, which is provided with a bore or recess $a$ throughout a portion of its length.

A head-piece B, having the arms $b$ $b$, is rigidly secured on the end of the handle, and the ends of these arms are split to receive the cross-bar C, after which they are secured firmly upon said cross-bar by set-screws $b'$.

The cross-bar C carries any suitable number of fingers or tines $c$, as shown in Figs. 1, 2, 3, and 4, or it may carry a hoe-blade, as shown in Figs. 5 and 6, as desired.

A rod D is arranged within the bore or recess $a$, and its forward end is swiveled to one of the fingers or tines or to the hoe-blade, while the rear end of said rod is connected by a screw $d$ with a sleeve E, mounted on the handle and adapted to be moved along the handle to operate the rod D and the cross-bar C. This sleeve E carries a detent $e$, which engages with a rack $e'$, set into the upper side of the handle.

The operation of my improved device is exceedingly simple. When it is desired to use the device as a rake, the sleeve E is pulled back into the position shown in Fig. 1, which thereby draws the fingers or tines $c$ into a position at an angle to the plane of the handle through the connection formed by the rod D, and the parts are all secured rigidly in place by means of a spring-controlled detent $e$, which engages with the teeth of the rack $e'$. The angle at which it is desired to maintain the fingers or tines may be regulated at will by allowing the detent to engage with a particular tooth on the rack, which will be readily understood by those accustomed to use implements of this character.

In order to convert the rake into a fork, it is only necessary to release the detent and push the sleeve forward. At the same time the rod D will move forward and push the fingers or tines into the position shown in dotted lines in Figs. 2 and 3, the detent again engaging the rack to secure the parts in a firm and rigid position.

In Fig. 4 I have illustrated a slightly-different construction, in which the rear end of the rod is provided with a screw-thread F, and by means of a thumb-piece $f$, arranged in said threaded portion of the rod, the said rod may be moved back and forth. The thumb-piece is arranged in a convenient place on the handle, where it can be easily operated.

The rod D is shown in a bore or recess in the handle; but it is obvious that it may be located beneath the handle and connected with the sleeve, in which position its operation will be essentially the same.

Instead of the fingers or tines which are secured on the cross-bar C, I may substitute a hoe-blade G, (shown in Figs. 5 and 6,) which will be operated in a manner similar to the fork or rake and whereby the device can be converted into a hoe or spade.

The advantages resultant from the simple construction and arrangement of parts of the invention will be manifest to all who are conversant with the general class of devices to which the same appertains.

The device is intended to be used in connection with any tool for which it is adapted.

Having thus fully described my invention, what I claim as new, and desire to secure by Letters Patent, is—

1. In a garden implement, the combination of a handle having a bore $a$ therein, a head-piece B provided with arms $b$ secured on the end of said handle, said arms being split at their ends to receive the cross-bar C, set screws B' securing the split ends of the arms together, a rod D arranged within the bore of the handle and having its forward end connected to a finger or hoe-blade, a sleeve E mounted on the handle, a screw $d$ connecting said sleeve and rod, and a detent $e$ arranged to engage a rack $e'$ set into the upper side of the handle, substantially as described.

2. In a garden tool or implement, the combination with a handle, one end of which is tubular or provided with a central bore, of a head piece having a central bore secured to the tubular end of the handle, said head piece being provided with side arms or projections, a cross bar or head pivotally connected with the outer ends of the side arms or projections, and provided with a number of fingers or tines, or a hoe or spade, a rod arranged in said tubular portion of the handle and adapted to slide therein, and passing through the central bore of the head piece, and pivotally connected at its outer end with the said fingers or tines, or hoe or spade, and means connected with the tubular portion of the handle, and with the rod therein, to adjust said rod and hold it in any desired position, said means consisting of a slide mounted on the tubular handle, provided on one side with a screw or projection extending through a slot in the handle, and connected with said rod, and on the other side with a pawl or detent adapted to operate in connection with a rack formed on, or secured to said handle, substantially as shown and described.

In testimony that I claim the foregoing as my invention I have signed my name, in presence of two witnesses, this 2d day of March, 1895.

GEORGE WASHINGTON BIDDELL.

Witnesses:
 ROBERT S. SHARP,
 THEODORE F. STEWART.